US008510148B2

(12) United States Patent
Norman

(10) Patent No.: US 8,510,148 B2
(45) Date of Patent: Aug. 13, 2013

(54) METHODS AND APPARATUS FOR ASSOCIATING AND DISPLAYING PROJECT PLANNING AND MANAGEMENT INFORMATION IN CONJUNCTION WITH GEOGRAPHIC INFORMATION

(75) Inventor: Timothy Andrew Norman, Oak Ridge, NC (US)

(73) Assignee: Alcatel Lucent, Paris (FR)

( * ) Notice: Subject to any disclaimer, the term of this patent is extended or adjusted under 35 U.S.C. 154(b) by 3121 days.

(21) Appl. No.: 11/069,261

(22) Filed: Mar. 1, 2005

(65) Prior Publication Data
US 2006/0212327 A1    Sep. 21, 2006

(51) Int. Cl.
*G06Q 10/00* (2012.01)
(52) U.S. Cl.
USPC .................... 705/7.23; 705/7.11; 705/7.12
(58) Field of Classification Search
USPC ........................ 705/7.11, 7.12, 7.23
See application file for complete search history.

(56) References Cited

U.S. PATENT DOCUMENTS

| | | | |
|---|---|---|---|
| 5,904,727 A * | 5/1999 | Prabhakaran | 701/454 |
| 6,538,674 B1 * | 3/2003 | Shibata et al. | 715/855 |
| 6,854,088 B2 * | 2/2005 | Massengale et al. | 715/764 |
| 7,239,930 B2 * | 7/2007 | Burda et al. | 700/100 |
| 2002/0116121 A1 * | 8/2002 | Ruiz et al. | 701/208 |
| 2003/0041087 A1 * | 2/2003 | Pothos et al. | 709/102 |
| 2003/0060973 A1 * | 3/2003 | Mathews et al. | 701/209 |
| 2004/0049345 A1 * | 3/2004 | McDonough et al. | 702/12 |
| 2005/0039163 A1 * | 2/2005 | Barrett et al. | 717/105 |
| 2006/0077095 A1 * | 4/2006 | Tucker et al. | 342/357.08 |
| 2007/0067196 A1 * | 3/2007 | Usui | 705/8 |

OTHER PUBLICATIONS

Stover, Teresa. Microsoft Office Stover Inside Out. Microsoft Press:Washington, 2004, pp. 328-329.*

* cited by examiner

*Primary Examiner* — Andre Boyce
*Assistant Examiner* — Renae Feacher
(74) *Attorney, Agent, or Firm* — The Law Offices of Peter H. Priest

(57) ABSTRACT

Systems and techniques for entry and presentation of project planning information, showing activities in their geographic context. Information relating to activities and groupings of activities is entered, updated and presented. Information associated with one or more groupings of activities is associated with a graphical icon, with the appearance of the icon changing in response to changes in the associated information. The icon is placed in a graphical display, with the graphical display showing geographic information, such as a map, and the icon being placed in a map location showing the location of the activities associated with the icon. The graphical display maintains links to the information associated with the icon so that updating the information changes the appearance of the icon, calling attention to changes in their geographic context.

20 Claims, 13 Drawing Sheets

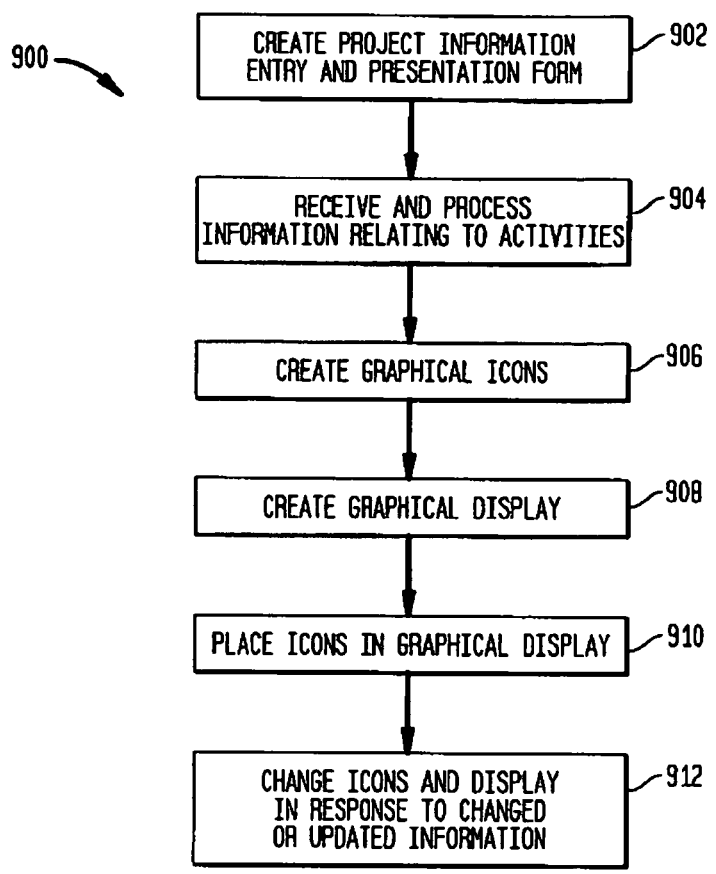

METHODS AND APPARATUS FOR ASSOCIATING AND DISPLAYING PROJECT PLANNING AND MANAGEMENT INFORMATION IN CONJUNCTION WITH GEOGRAPHIC INFORMATION

FIELD OF THE INVENTION

The present invention relates generally to improved systems and techniques for project planning and management. More particularly, the invention relates to systems and techniques for collecting and organizing project management information and presenting information in association with geographic areas to which the information relates.

BACKGROUND OF THE INVENTION

Planning and management of projects typically involves the collection and maintenance of information giving insight into the requirements, budget, costs, schedule and progress of the project. In order to manage a project, it is necessary to collect this and similar information at the beginning of the project and as the project proceeds, and then to present information about the project in a comprehensible way. If project information is to be comprehended and used to give insight into the progress of the project, potential delays, cost overruns and obstacles to project completion, it is not sufficient merely to present all available information relating to the project. A large project may be complex and project information may include numerous elements. Such elements may include, for example, budget, scheduling and progress information for numerous smaller elements of a project.

In order for a user of the information to comprehend the information, he or she must be able to focus on the desired information. In addition, it is highly desirable for information to be presented so that relationships between various informational elements are easily comprehended, and so that the information presented can be easily updated to reflect current and project scheduling and progress. Items of interest relating to a project include the scheduled start and completion, as well as the actual start and completion, of various elements of the project. The relationship between actual and scheduled events, for example, if the actual start of an element is early, on time or late, is of particular interest. Presentation of such information in a readily comprehensible way is of great assistance in understanding and managing elements of a project. In addition, the geographical location of various activities is frequently of great importance. Many projects, such as construction projects, are related to geographical locations where they are being conducted, and numerous projects involve coordinated activities distributed over a number of geographical locations. Activities in one location may depend on activities in another location, and a view of the scheduling and progress of a project in relation to the locations in which various activities are taking place provides important insight into the status of the overall project.

There exists, therefore, a need for systems and techniques for presenting project information in a way that is easily comprehensible to a user and easily updated, and shows associations with geographical location relating to elements and activities comprising the project.

SUMMARY OF THE INVENTION

In one exemplary embodiment, a system for information presentation and display comprises a server communicating with a plurality of user terminals. The server hosts a project planning module and a graphic display module. The project planning module receives and presents project planning information relating to scheduling and progress on a plurality of activities. The activities are preferably assembled and considered in larger or smaller groupings, with a grouping of activities being able to be viewed as a unit, or with each of the individual activities being viewed. One example of a grouping of activities is construction, power provision and data communication provision for a central station. Another example of a grouping is construction of a section of a communication network, including central and satellite stations and communication links between the stations. The information viewed can be filtered according to any number of criteria, for example, type of activity, scheduled completion date, actual completion date, whether or not the activity has started or finished, or any of a number of other criteria.

One or more groupings of activities are represented by icons, with each icon having characteristics associated with information relating to the grouping of activities. An icon changes appearance in response to changes in the information associated with the icon. One or more icons appear in a graphic display that includes geographic information, such as a map image, relating to locations where activities are being carried out. The icons appearing on the graphic display are located in appropriate locations. For example, the icons may appear at appropriate locations on a map image. The icons appearing on the graphic display maintain links to the information in the project planning module, so that changes to the information cause changes in the appearance of the icon. A user is thus able to see activities in the context of their geographic locations and to observe changes and progress in their geographic context.

A more complete understanding of the present invention, as well as further features and advantages, will be apparent from the following Detailed Description and the accompanying drawings.

BRIEF DESCRIPTION OF THE DRAWINGS

FIG. 9 illustrates a process of project information entry and presentation according to an aspect of the present invention.

DETAILED DESCRIPTION

The present invention will be described more fully hereinafter with reference to the accompanying drawings, in which several exemplary embodiments of the invention are shown. This invention may, however, be embodied in various forms and should not be construed as limited to the embodiments set forth herein.

Figure 1:
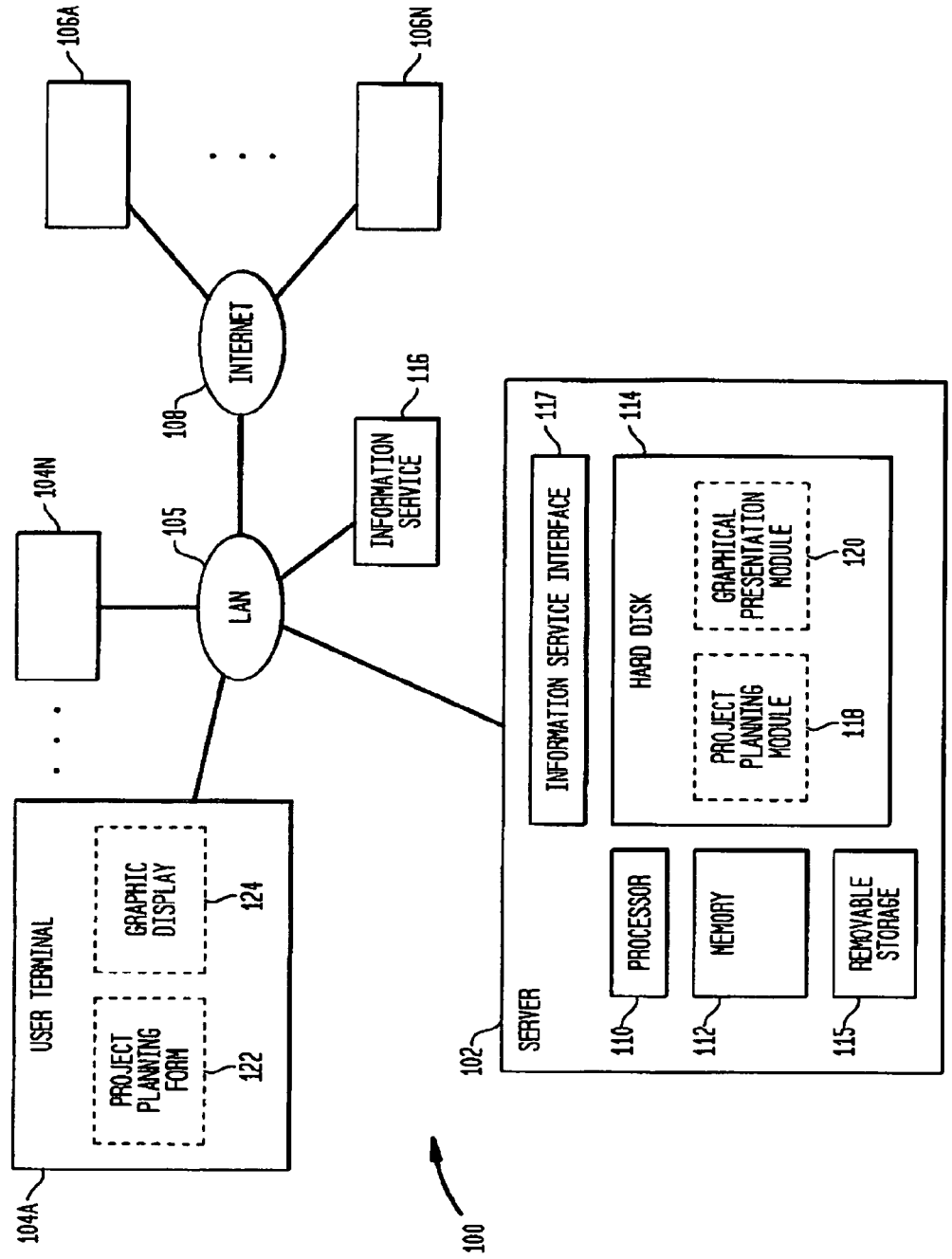
FIG. 1 illustrates a system used for processing and presenting project planning information according to an aspect of the present invention

FIG. 1 illustrates a system 100 for processing and presenting project planning information according to an aspect of the present invention. The system 100 suitably employs a server 102 communicating with a plurality of user terminals 104A . . . 104N over a local area network 105. Additional user terminals 106A . . . 106N communicate with the server 102 through a connection to the local area network 105 via any suitable communication connection, such as the Internet 108, for example. The server 102 includes a processor 110, memory 112, long term storage such as a hard disk drive 114, and removable storage 115. The server 102 also has access to one or more information services such as an information service 116, through an information service interface 117. The information services provide information that can be examined to determine if adverse conditions are present that may affect timely completion of project activities. For example, information services may provide weather information or news and the information they provide can be examined to determine if it includes reports of conditions affecting geographic areas in which project activities are planned or underway.

While communication is illustrated here as conducted over the local area network 105 and the Internet 108, it will be recognized that numerous alternative implementations are possible, for example a single computer operated by a single user, or a plurality of user terminals communicating with a server through a local area network with no access through the Internet.

The server 102 hosts a project planning module 118 and a graphical presentation module 120, suitably implemented as software programs stored on the hard disk drive 114 and executed by the processor 110. The project planning module 118 allows a user to generate a project information entry and presentation form 122 to receive and present project information and to update and otherwise change the presentation of information in response to entry of new or updated data, the advancing of the current date, and other changes in data relating to the information presented by the form. For simplicity, the form 122 is shown here as displayed using the user terminal 104A, but it will be recognized that any user terminal may be used to display and work on any form to which the user has authorized access. Different users may have different levels of access, and a user may have different levels of access to different forms. For example, one user may be allowed to view an existing form without making any changes, another user may be allowed to make changes to data fields in a form in order to see the effects of those changes, but not to save the form, and another user may be allowed to make and save any desired changes to a form.

The form 122 provides a number of different information fields, including comments, labels, static data fields for storing predefined data, data entry fields for entry of information and result fields taking on values in response to entered data. The form 122 includes definition of relationships between fields, allowing comparisons between different data elements and computations using different data elements, in order to produce results showing the relationships between different data elements. For example, comparisons between scheduled and actual start or completion of an activity may be defined, with the result of the comparison producing a value or action in a result field.

The project planning module 118 allows the user to define project elements and activities and to associate status information and other information with the project elements and activities. The user is able to define criteria for satisfactory performance and to define responses and displays to entry of information indicating deviation from the criteria. For example, entry of the date of actual completion of a project may cause the appearance of a completion indicator, approach of a scheduled completion date may cause the appearance of an alert indicator, and so on.

The project planning module 118 allows for the definition of graphical icons representing project elements or activities. Each icon comprises one or more graphical objects, with each graphical object having one or more attributes linked to project information. In one embodiment of the invention, an icon may comprise one or more bars arranged in suitable configurations. Each bar represents an element or activity connected with a project and each bar may have various visual characteristics, such as colors or fill elements, such as squares or diamonds, that are connected with various elements of project information, such as status information, and the relationship of the project information with predetermined criteria. For example, a bar associated with an activity may be colored green, yellow or red if the activity is proceeding on schedule, is in danger of being completed late, or has been or definitely will be completed late, respectively. A bar may be filled with a square to indicate actual start of the activity, or a diamond to indicate actual completion of the activity.

The graphical presentation module 120 allows for the display of icons linked to information elements defined using the project planning module 118. The icons may suitably be defined using the project planning module 118 and placed, for example by copying and pasting, into a graphic display 124 generated and presented using the graphical presentation module 120. The graphic display 124 is shown here as displayed using the user terminal 104A, simultaneously with the form 122, but it will be recognized that the graphic display 124 and the form 122 may be displayed sequentially or independently.

Once an icon is placed into the display, the project planning module 118 continues to maintain links to the icon, so that updating of information using the project planning module 118 will cause changes in the appearance of the icon.

The graphical presentation module 120 may be used to show the geographical location where activities are being conducted. The graphical presentation module 120 may be used to import a digital representation of a map, and icons representing activities in a particular geographical area can be placed on appropriate areas of the map. The icons are suitably linked to information fields defined using the project planning module 118. Suitably, the project planning module 118 may be used to create data fields to allow entry of data and generation of results giving insight into an activity. The project planning module 118 is used to define graphical icons having attributes linked to the data fields, with the attributes depending on the values contained in the data fields and the relationships between the values in the data fields. A digital map image is created using the graphical presentation module 120. If desired, an existing image may simply be imported. The icons are then placed over the image in appropriate locations. The project planning module 118 may then be used to update information with which the icons are associated, and the appearance of the icons will be updated in accordance with the updated information. The changes in appearance of the icons thus draw attention to the progress of activities and changes in conditions, and places this information in a geographical context.

Figure 2A:
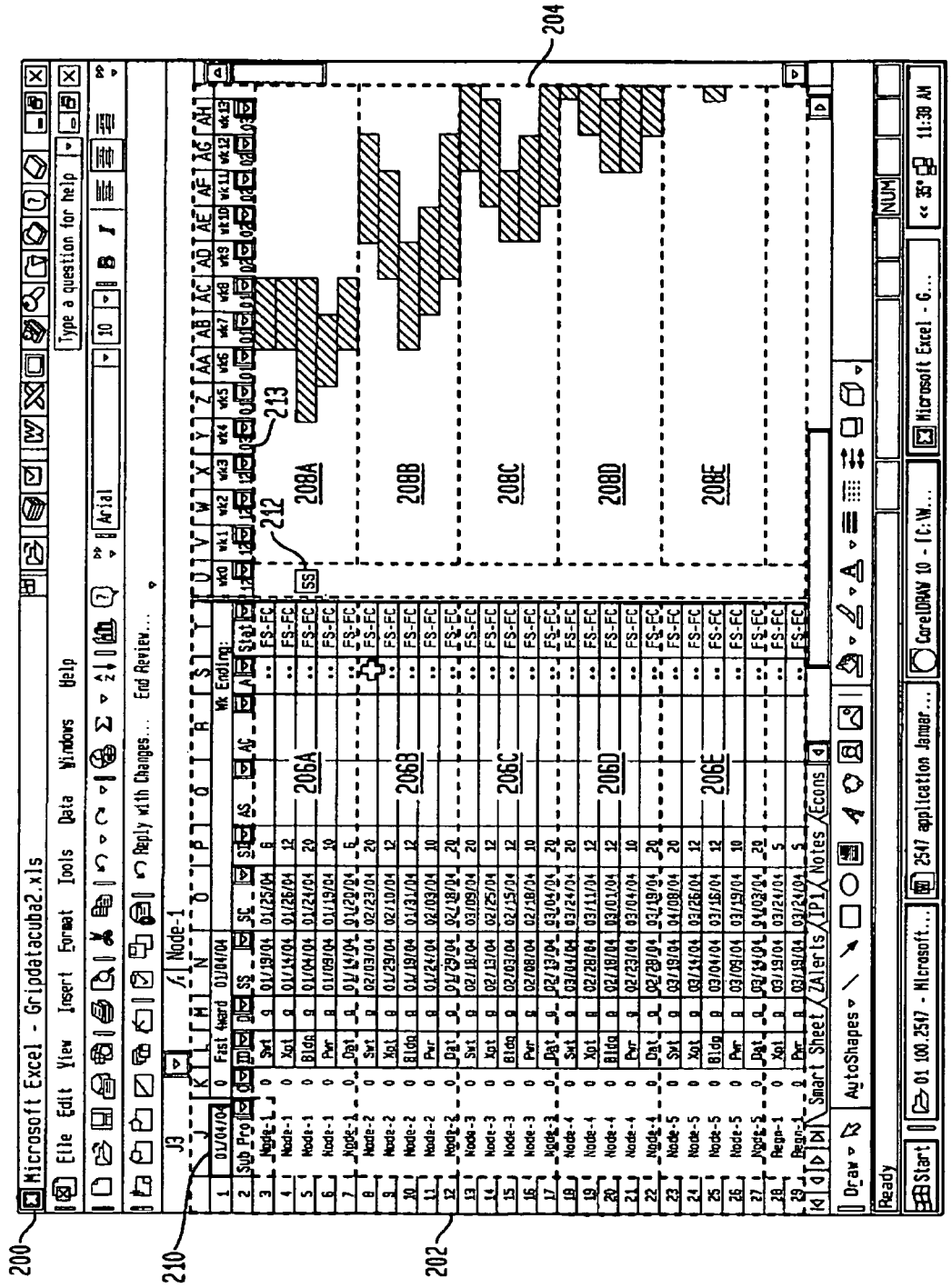
FIGS. 2A-2D illustrate a project information entry and presentation form according to an aspect of the present invention.

FIG. 2A illustrates a partial view of an exemplary project information entry and presentation form 200 such as may be created using the project planning module 118. Additional views will be shown in subsequent figures and discussed further below. The form 200 is similar to the form 122, but is a specific instance of a form relating to a specific project, and includes and displays specific illustrative information.

In the present exemplary embodiment, the form 200 is a MICROSOFT EXCEL spreadsheet with data fields and relationships between data fields defined and organized so as to provide project planning information. The specific project is construction of a hypothetical landline and cellular communications infrastructure in the nation of Cuba. The form 200 includes an information entry and display section 202 and a progress chart section 204. The information section 202 includes definitions and information related to various activities required to complete the overall project. The project includes construction and placement of a six node liner transport chain, with activities including the laying of five cable fiber segments, the construction of four medium central offices, the construction of one regeneration hut, the design and placement of 54 cellular sites and the design and construction of 22 satellite/radio stations. The design and placement of the 54 cellular sites is organized and planned as four subprojects. The overall time for the project is 52 weeks, beginning on Jan. 4, 2004 and ending on Jan. 2, 2005.

The information section 202 includes descriptive, scheduling and status information for each project element, with project elements being further divided in order to show individual activities. The information section 202 includes an activity information grouping for each project element. The groupings 206A, 206B, 206C, 206D and 206E are visible in the view shown here. The progress chart section 204 includes status bar groups for each project element, with the status bar groups 208A, 208B, 208C, 208D and 208E being visible in the present view. Each status bar provides graphic scheduling information for a particular activity being carried out in completing a project element.

The form 200 includes a current date field 210, storing and presenting a date that may be used in comparisons and computations. The date is typically the current date on which information is being entered or reviewed and may be entered by a user, taken from a computer or network clock or obtained in any of a number of other suitable ways. The user can also examine the status of the project at future times by entry of a "fast forward" date in the field 211. Entry of the "fast forward date" updates scheduled start and scheduled completion indicators such as the indicator 212. The indicator 212, "SS," is a scheduled start indicator and indicates that the set of activities represented by the grouping 208A is scheduled to start as of the currently entered date, that is, Jan. 4, 2004, but entry of a later date in the current data field 210 or the fast forward field 211 would add indicators to activity groupings to show their scheduled status, such as "SS" for scheduled start and "SC" for scheduled completion. Entry of a date in the fast forward field 211 would not call for entry of actual progress data, because the date does not represent an actual date that has been reached.

The form 200 further includes a set of filtering menus, in order to restrict the data groupings being viewed to those meeting specified criteria, for example, those having a particular scheduled starting or completion date, those falling into a particular category of activity, those comprising a particular project element or any of a number of other criteria. The filtering menus are the pulldown menus 212A-212L in the information section 202, and a menu for each week of the project in the progress chart section 204. The pulldown menu 213 is an example of the filtering menus for the successive weeks.

Each activity information grouping includes identifying and scheduling information for a project element. The identifying and scheduling information influences the appearance and attributes of a graphical icon that can be constructed and associated with such information, for example using the project planning module 120. Such graphical icons are presented as elements of a graphical image presented using the graphical presentation module 120.

Figure 2B:
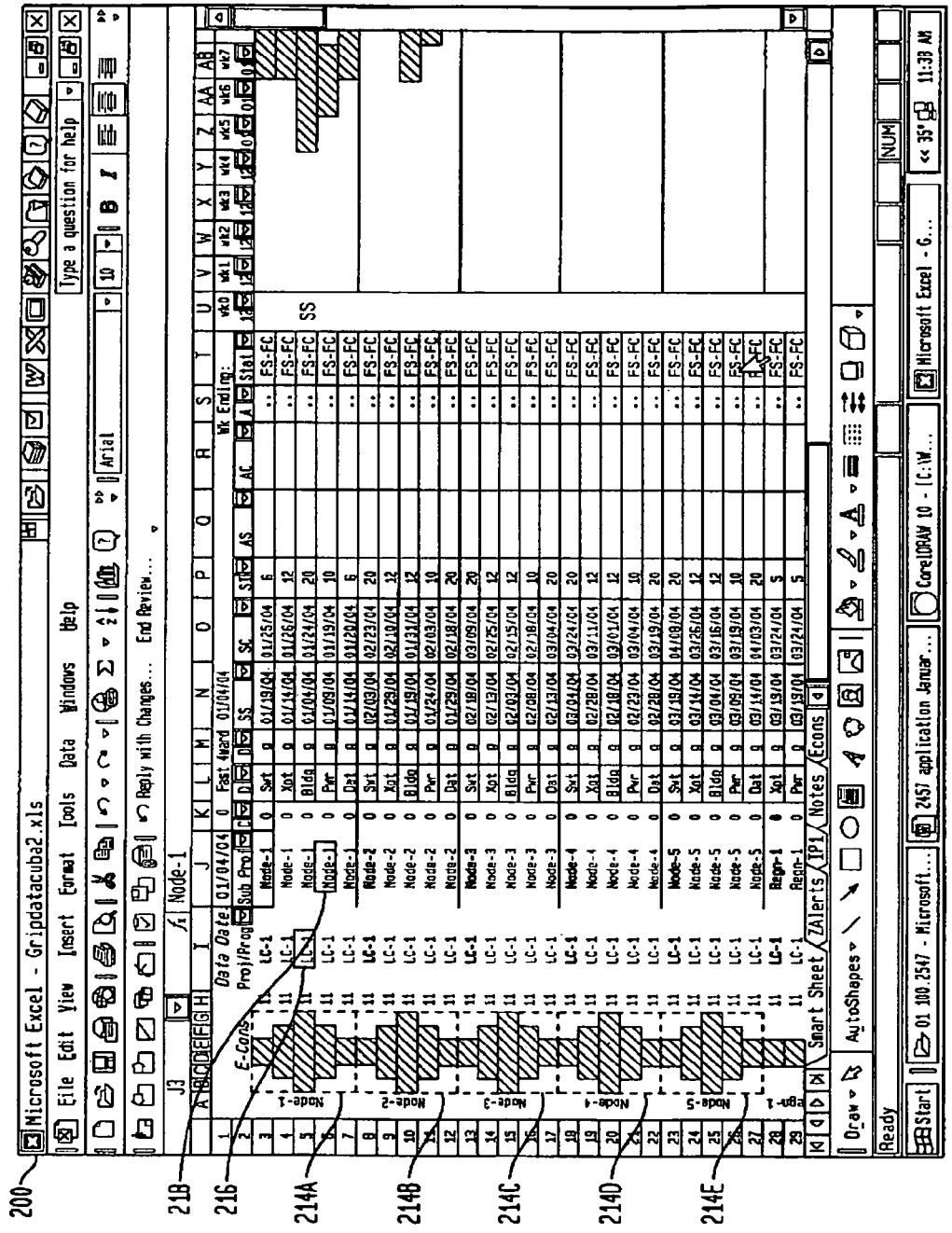

FIG. 2B illustrates an additional view of the form 200. In FIG. 2B, the view window has been shifted to the left to show additional details of the form 200. The form 200 includes the elements discussed above in connection with FIG. 2A, and additional elements are also visible. A number of graphical elements 214A-214E are visible. Each of the graphical elements 214A-214E comprises an arrangement of bars with the bars having varying lengths. Each bar represents an activity associated with the project element represented by a corresponding graphical element, with the length of the bar representing an approximation of the level of effort required to accomplish the activity. The form 200 also includes a project identifier for each activity included in a project element, of which an example is the identifier 216, identifying a larger project component to which the project element belongs, that is, a first linear transport chain, or LC1. The form further includes a project element identifier, of which an example is the identifier 218, providing a name for the project element, that is, Node 1. Additional details are illustrated in subsequent figures and discussed below.

Figure 2C:
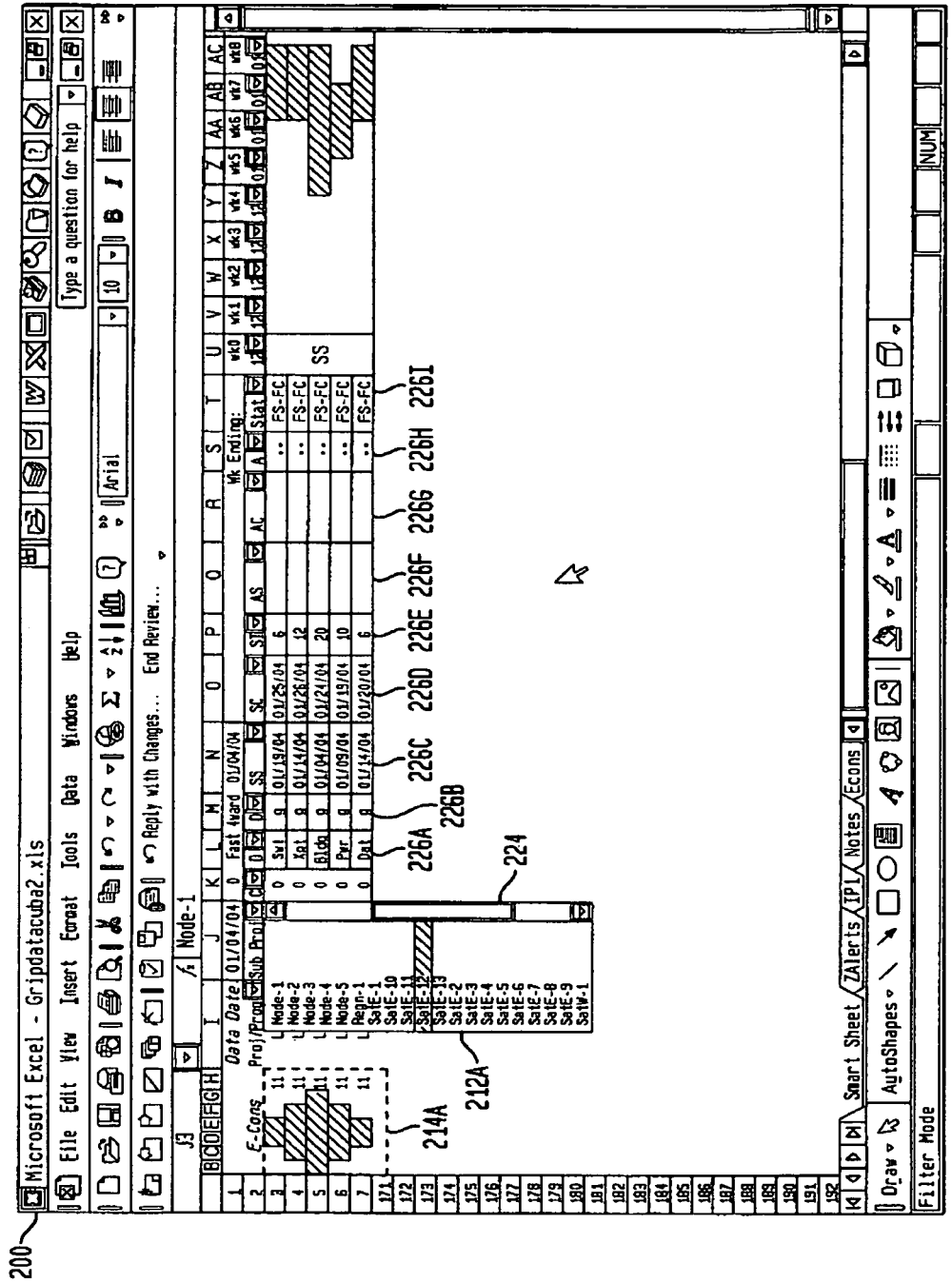

FIG. 2C illustrates further information for the project element 206A of FIG. 2A. The display has been restricted to information relating to the element 202A because the filtering menu 212A has been set to "Node 1". The menu 212A is shown open here, and can be seen to list a selection of the various program elements included in the project, in addition to the additional selection options "all," "top 10" and "custom". The project element "Node 1" is shown highlighted, because that element has been selected for display, so that activities related to that element will be displayed and other activities will be hidden. As a result of the selection, the icon 214A, representing the activities associated with the Node 1 installation, and information associated with those activities, is displayed. The filtering menu 212A provides for numerous additional choices. Additional elements that may be selected are shown, and the remaining elements may be seen by moving the scrollbar 224. In addition to the criteria seen here, numerous other criteria may also be used for selection of information to be displayed. For example, in addition to selecting specified activities or groups of activities based on their relationship to a project element or grouping of project elements, selections may be made based on activities that are to start within a designated period, activities that are in progress, activities that have started or finished late, activities whose scheduled start or completion date has passed, whether or not those activities have actually started or been completed, or activities having a designated status. These and numerous other criteria or combinations of criteria may be chosen for selection, in order to focus examination on items of immediate interest.

The form 200 includes information items for each activity, arranged in the columns 226A-226I. Column 226A shows activity identifiers. In this case, the activities are identified as placement of a switch (swt), placement of transport (xpt), construction of buildings and infrastructure (Bldg), installations necessary to provide power (pwr) and installations necessary to provide data communication (data). Columns 226C and 226D show scheduled start and completion dates for each activity and column 226E shows the scheduled time for completion for each activity, that is, the number of days between the scheduled start and the scheduled completion. Columns 226F and 226G show actual start and completion dates for each activity, and column 226H shows the actual time between start and completion. Column 226I shows the status of each activity and column 226B shows the schedule alert status of each activity. The status of an activity is a status for start and completion. Status for start or completion may be early (E) on time (O), late (L) or future (F) and activity status may be early start, early completion, (ES-EC), early start, on time completion (ES-OC), future start, future completion (FS-FC) or any other combination. The schedule alert status shown in column 226B may be green (g), yellow (y) or red (r)

and indicates whether the activity is proceeding normally, is in danger of late completion or is relatively sure to be completed late. For simplicity of illustration, the schedule alert status values are shown here as manually entered, but it will be recognized that computing or choosing schedule alert status values may be accomplished in other ways, for example comparing the actual calendar date against a scheduled start or completion date of an activity and setting the schedule alert status value to yellow or red if the actual date is past the scheduled date or so close to the scheduled date as to jeopardize or preclude timely completion. For example, the actual start and completion dates of an activity, appearing in the scheduled start and scheduled completion columns 226F and 226G, respectively, can be compared against the scheduled start and completion dates appearing in the scheduled start and scheduled completion columns 226C and 226D, respectively. Any delays can be evaluated in light of the scheduled interval between start and completion, whose value for each activity appears in the scheduled interval column 226E. If there has been no actual start or completion, the current date, here shown appearing in a current date field 210, may be used for the comparison.

For example, a criterion used for setting the schedule alert status for an activity may be that the status will be set to "red" if the actual start is more than 25% of the scheduled interval later than the scheduled start, or if the current date is more than 25% of the scheduled interval past the scheduled start date and there has been no actual start. A further suitable criterion may be chosen such that the status will be set to "yellow" if the actual start is more than 15% past the scheduled start but less than 25% past the scheduled start. Suitable formulas may be used to populate the cells comprising the column 226B.

In the present case, the graphical object 227 appears as yellow because the schedule status for the activity with which it is associated has been set to "yellow". This status is supported by the critierion discussed above, because the activity began on Jan. 16, 2004, 2 days past the scheduled start date. This delay was more than 15% of the scheduled interval of 12 days.

As will be seen in subsequent figures and discussed below, entry of new information using the form 200 results in changes to alerts and displays presented using the form 200, as well as changes to the graphical elements presented using the graphical presentation module 120.

Figure 2D:
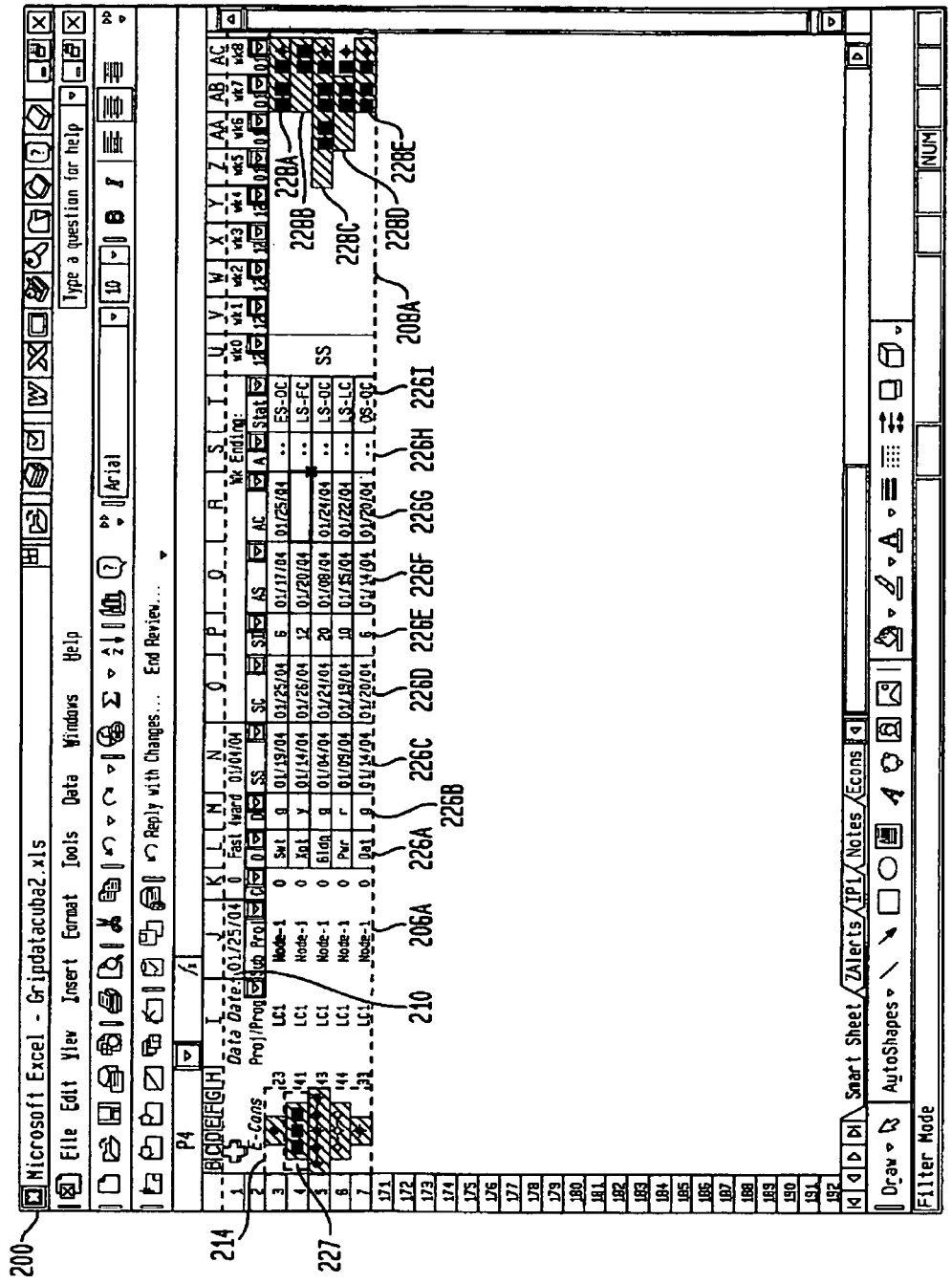

FIG. 2D illustrates the form 200 after some time has passed, with the view being restricted to the project activities related to Node 1. The current date field 210 has been updated with the date Jan. 25, 2004, and actual start and completion dates have been provided for some of the project activities. The activity information grouping 206A and the status bar group 208A are visible, showing activity information and progress information for the project element under examination. Actual start and completion dates for the switch installation, building and provision of power and data have been entered in the actual start and completion columns 226F and 226G, respectively, the computation and display of elapsed time between start and completion of the activities, and the display of this information in column 226H. In addition, the status bars 228A-228E have been updated, showing a square indicating that an activity has started, and a diamond indicating that an activity has been completed.

The graphical icon 214A has also been updated, by filling each bar corresponding to an activity with a square if the activity that has been started but not completed and diamonds for each completed activity. In addition, the schedule alert status of the graphical icon has been updated as a result of inputs to the schedule alert status column 226B.

Each graphical icon, such as the icon 214A, may suitably be employed in a graphical display providing information presented in primarily graphic format, and wherein the information is presented in association with geographical information. Each graphical icon is placed into the graphical display in such a way that links are maintained between each icon and the data that refers to or influences it. The graphical icon may be defined and placed in the form 200 using the project planning module 120, with the definition of the graphical icon including relationships causing the graphical icon to respond as desired. For example, the definition of the graphical icon may include references to fields to which data may be entered, and to computations involving those fields. The definitions of the elements of the graphical icon 214A, for example, include references to fields in the actual start and actual completion columns such that entry of dates in those fields causes squares or diamonds to appear in the graphical icon 214A.

Once the icon has been defined, it may be copied to an appropriate location in a graphical display presented using the graphical display module 120, with the copying being performed in such a way that the links to the fields and relationships used in the initial definition of the graphical icon are preserved.

Figure 3A:
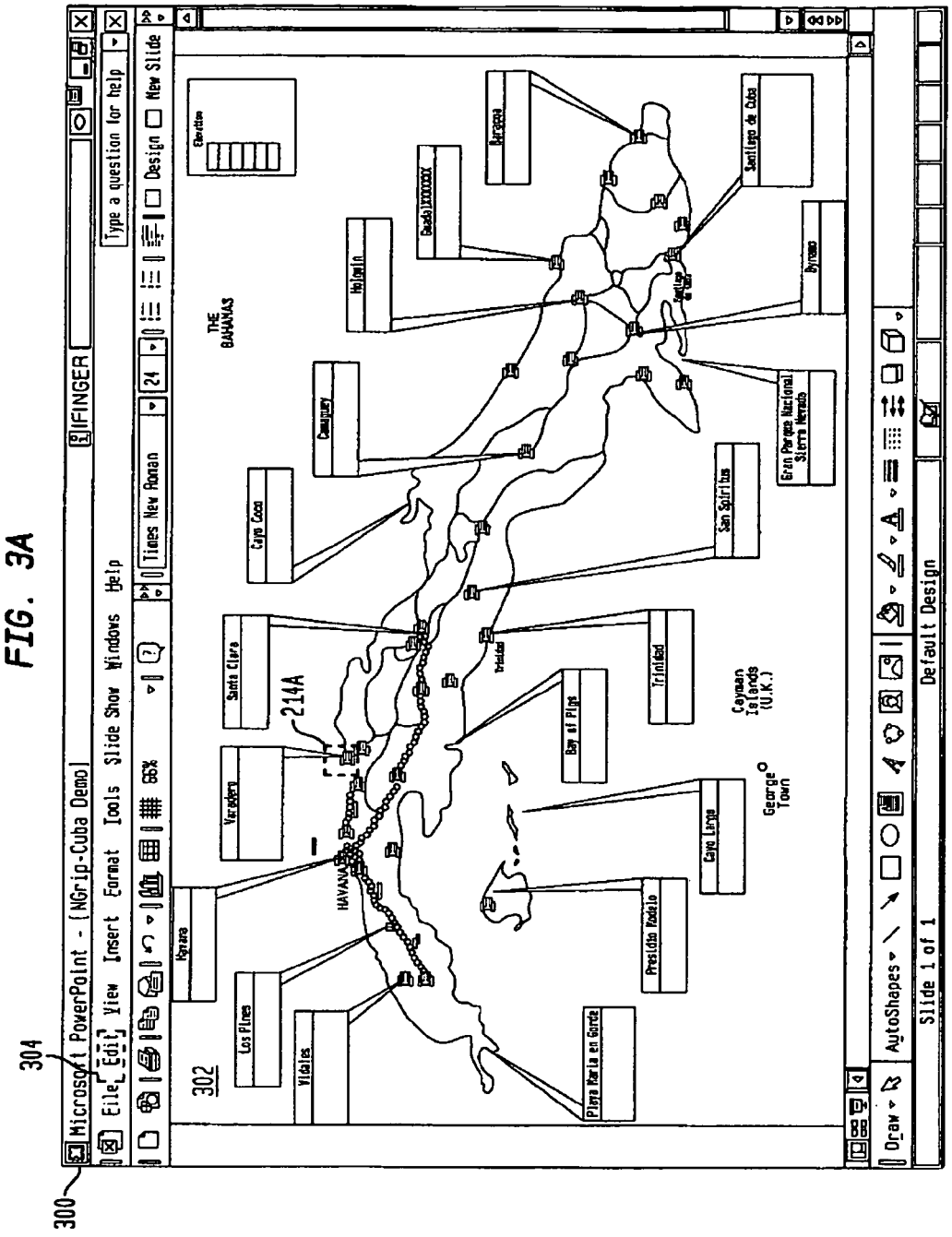
FIGS. 3A, 3B and 4-8 illustrate graphic displays according to an aspect of the present invention.

FIG. 3A illustrates a graphic display 300, suitably presented by the graphical display module 120. The exemplary display shown here is an image created by MICROSOFT POWERPOINT, and shows a plurality of graphical icons, such as the icon 214A, in their geographical context. This contextual display is accomplished by placing the icons over a digital map image 302.

The placement of the icons shows the geographical locations of the activities depicted by each icon. Each icon in the display 300 was placed by performing selection and copying of the corresponding icon using the form 200 presented by the project planning module 118. The icon is then placed in the display 300 by using an appropriate command provided by the graphical display module 120. In the exemplary embodiment illustrated here, the icons have been copied from the form 200 and pasted into the display 300 using a "Paste Special" command selected from a pulldown menu invoked by activation of the "Edit" command 304. Selection of the "Paste Special" command causes the appearance of a dialog box, and the selection "Paste Link" is made in the dialog box. The icon then appears on the form 300 and can be dragged to an appropriate location on the image 302. Such placement of the icons by using the "Paste Link" command causes the icons to change in accordance with corresponding changes to the form 200, allowing a user to see the changes in their geographical context. In addition, selection of an icon, for example by double clicking the icon, causes highlighting of the information associated with the icon as presented by the form 200, allowing convenient access to information relating to the activities represented by the icon.

Figure 3B:
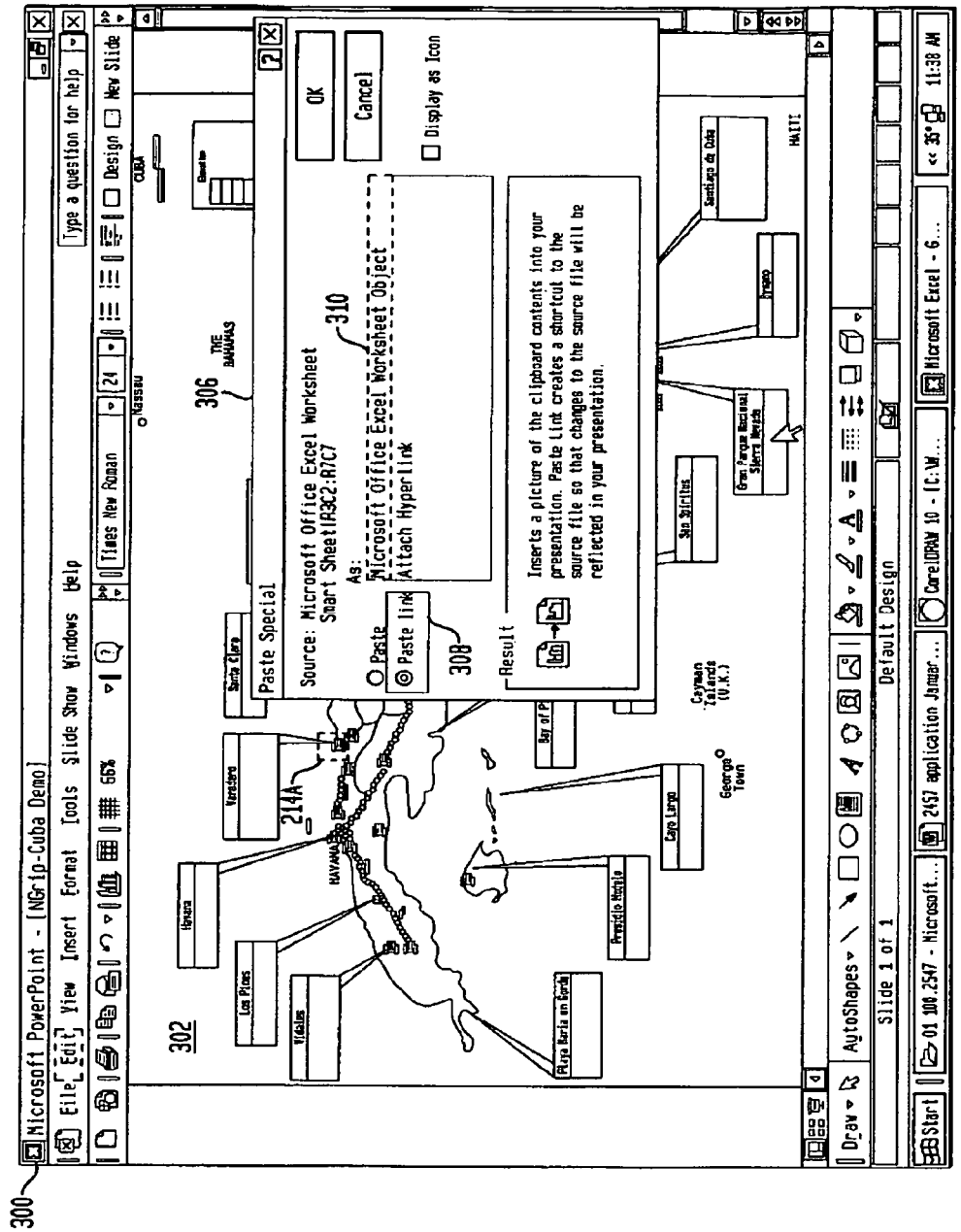

FIG. 3B illustrates the display 300, with the open dialog box 306 shown displayed in response to activation of the "Paste Special" command. The command "Paste Link" 308 has been selected, causing appearance of the types of links to be used. The option "Microsoft Office Worksheet Object" 310 has been selected here.

Figure 4:
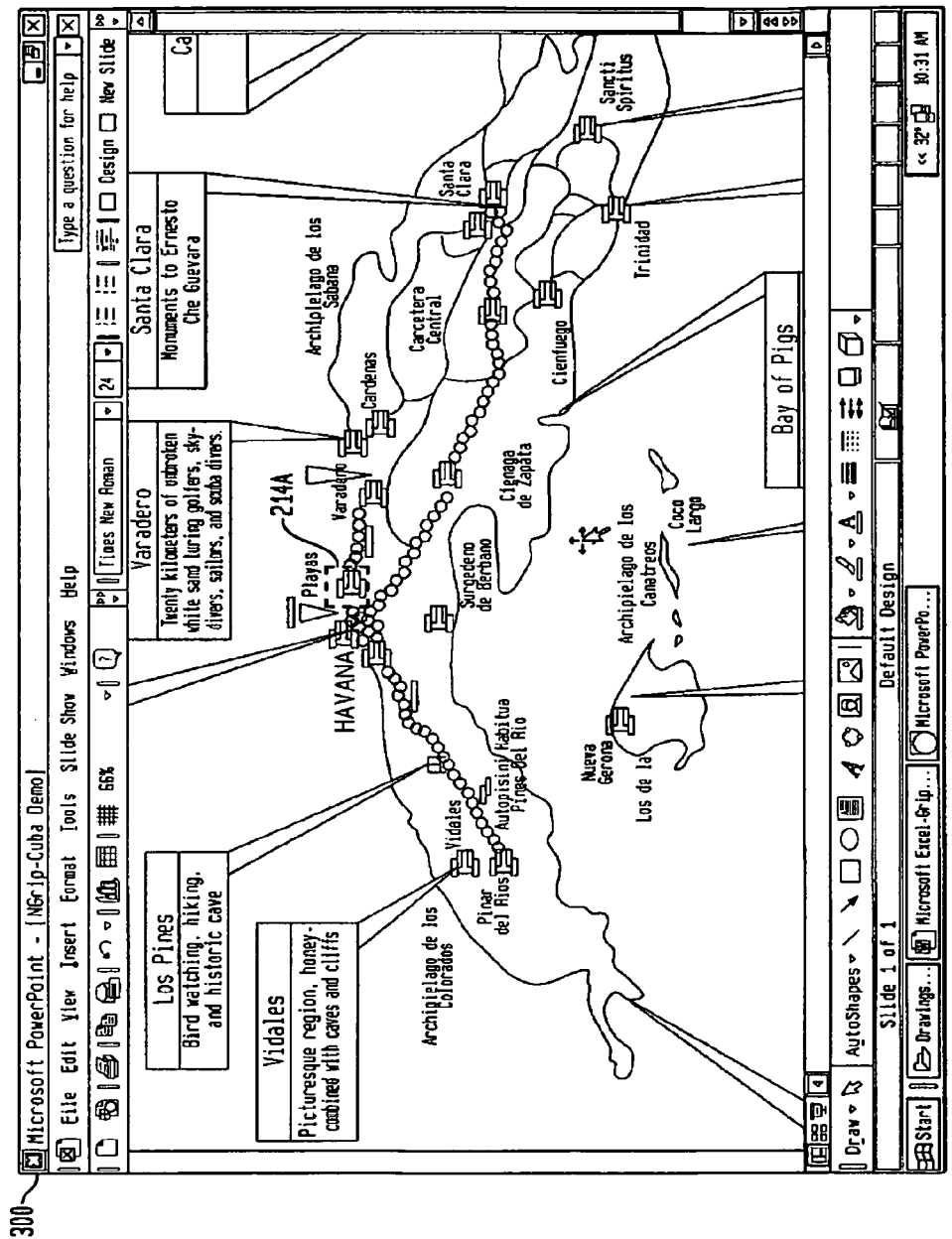

FIG. 4 illustrates the display 300, zoomed in to show greater detail and showing only a subset of the icons as a result of a filtering selection performed using the form 200. In this case, the overall project element "LC 1" was selected, so that the display 300 shows only those icons associated with that project element. The icon 214A is visible here and serves as an example of the icons under consideration. In addition, the form 200 shows information about only the elements associated with the overall project element "LC 1" when that filtering selection is in effect.

Figure 5:
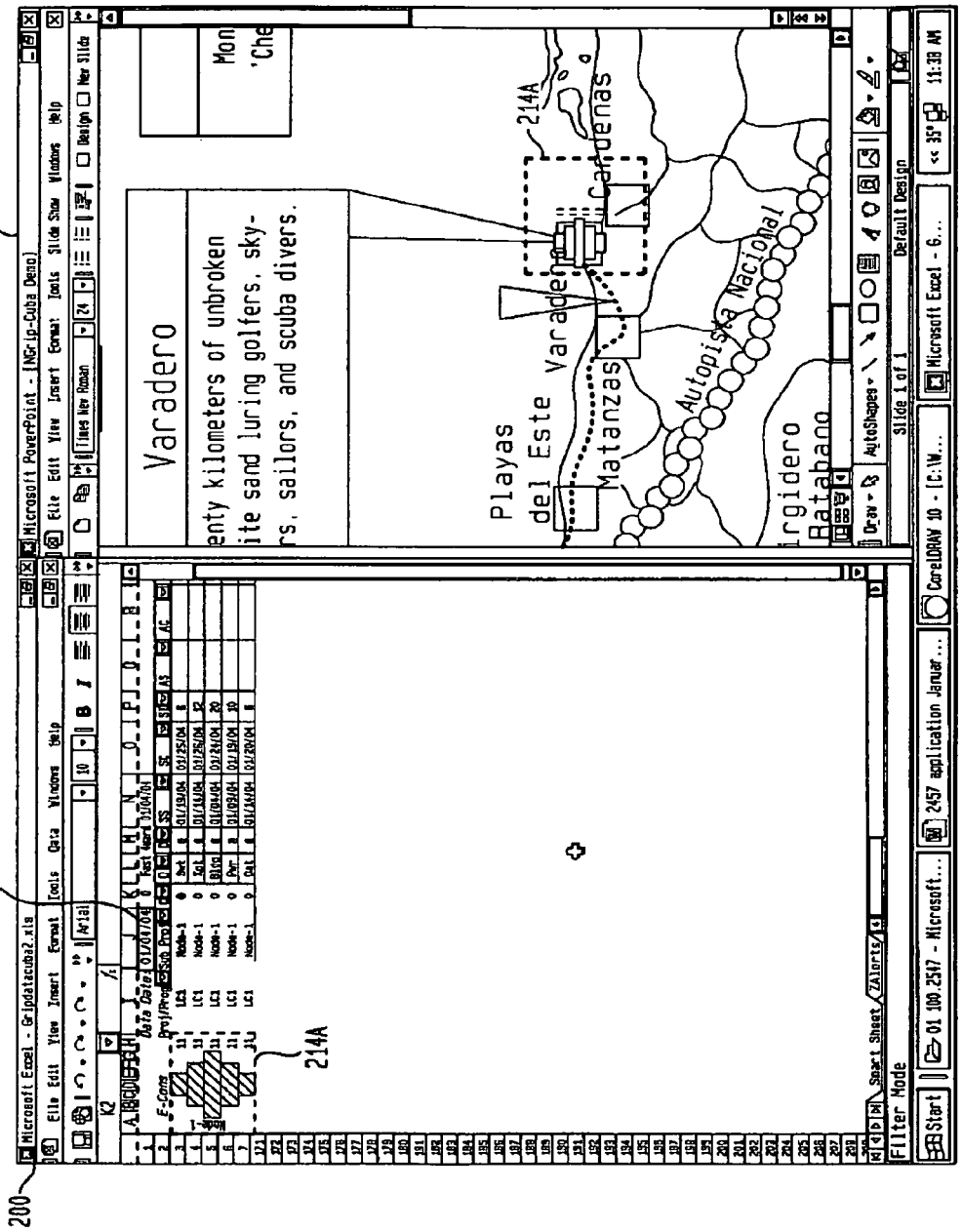

FIG. 5 illustrates the display 300, zoomed in still further, and with the displayed icons restricted to the icon 214A. The form 200 is also visible. The icon 214A can be seen in both the form 200 and the display 300, and changes affecting the icon 214A will appear in both the form 200 and the display 300. In FIG. 5, the date entered in the current date field 210 is Jan. 4, 2004, and all activities related to the icon 214A are future activities. The bars representing the activities are colored green.

Figure 6:
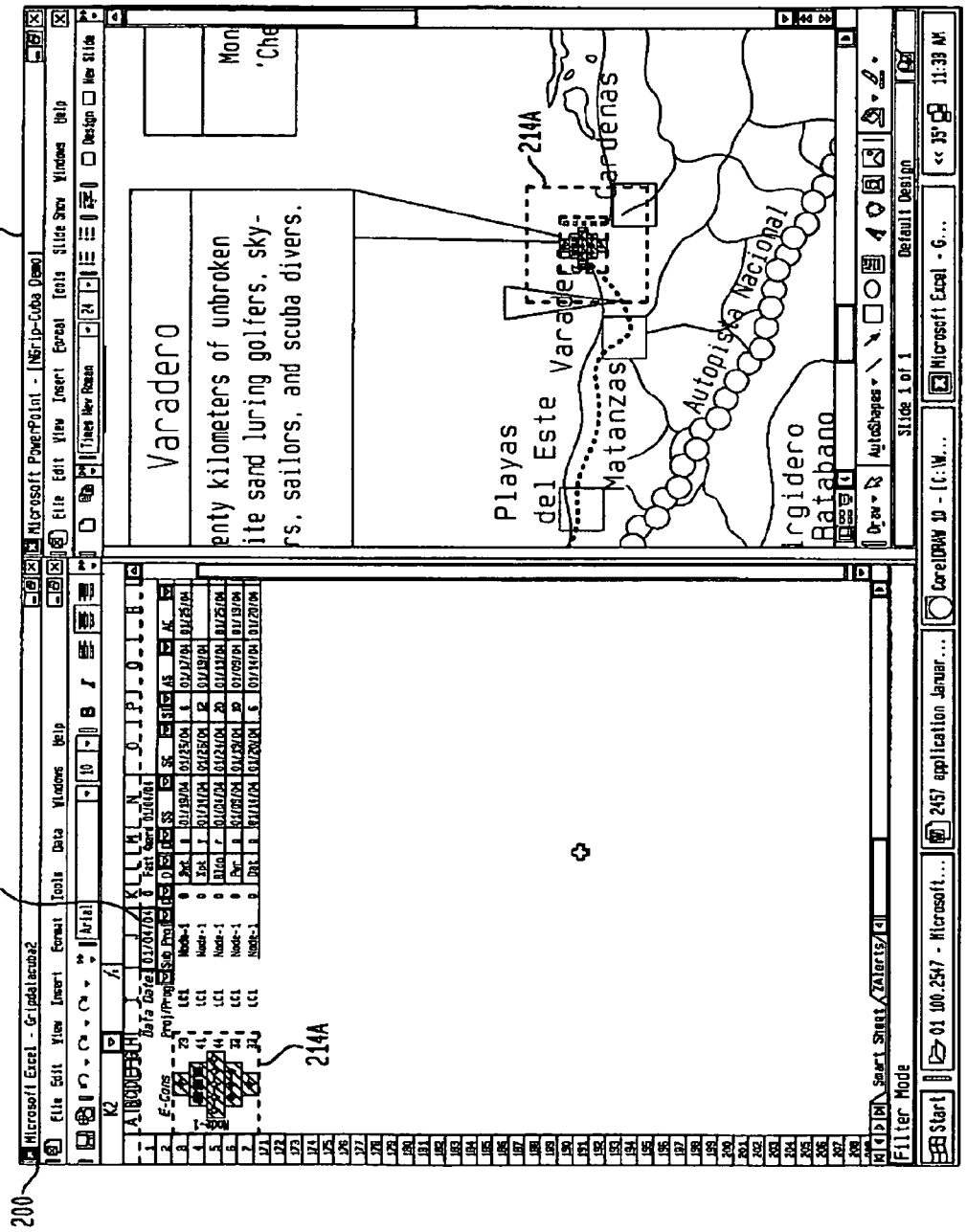

FIG. 6 illustrates the display 300 and the form 200, with the date in the date entry field being Jan. 25, 2004. A number of actual start dates and actual completion dates have been entered, and schedule alert status entries have been updated to reflect the situation as of the date shown. Actual start and finish dates for switch installation are Jan. 17, 2004 and Jan. 25, 2004. The actual start date for transport installation is Jan. 19, 2004, but no actual completion date has been entered. The actual start and completion dates for building construction are Jan. 11, 2004 and Jan. 25, 2004, the actual start and completion dates for power installation are Jan. 9, 2004 and Jan. 19, 2004 and the actual start and completion dates for data installation are Jan. 14, 2004 and Jan. 19, 2004. The bars making up the icon 214A have been filled with squares where an activity has started, and with diamonds where the activity has been completed. The schedule alert status for transport installation has been changed to yellow because timely completion is uncertain, and the schedule alert status for building construction has been changed to red because the activity was completed late.

Numerous conditions may arise that affect timely completion of an activities or group of activities. A number of these conditions, such as forecasts of severe weather, threats of civil unrest, may be associated with particular sites or regions and may have particular effect on activities being carried out in those sites or regions. Therefore, a system according to an aspect of the present invention may provide for the presentation of alert indicators, used to identify sites and activities threatened by the conditions prompting the alerts.

Figure 7:
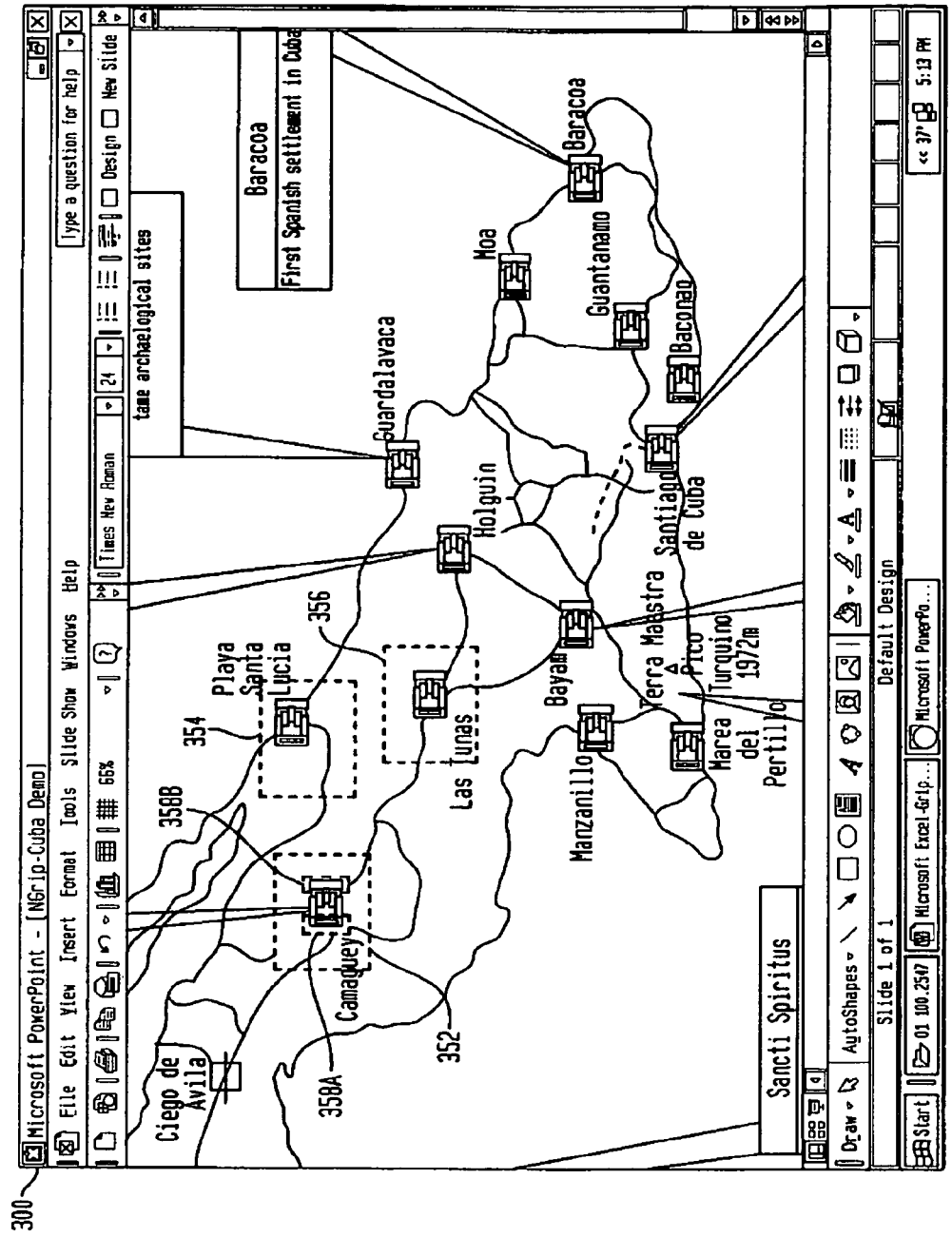

FIG. 7 illustrates the display 300, after the form has been used to limit the project activities under consideration to construction of eastern satellite sites. Each of the icons, for example the icons 352, 354 and 356, have associated alert flags, such as the flags 358A and 358B, serving to draw attention to the icons. The flags also serve as indicators of a situation needing attention. The alert flags appear as a result of entry of an alert indicator, such as an entry of a code in a designated field, using the form 200. An alert indicator may be entered by an operator in response to any number of conditions, but one condition that is particularly appropriate for entry of an alert flag is the appearance of a regional condition, such as a threat of severe weather. If the alert indicators are entered by an operator, the operator simply obtains or receives information describing the condition, identifies the activities affected by the condition and enters an alert indicator for the affected activities. Entry of the alert indicators highlights the icons associated with the affected activities. A subsequent user of the display 300 can then easily be alerted to the regional conditions.

In addition to manual entry by an operator, an alert indicator may suitably be generated automatically. Numerous sources provide information that may be extracted and interpreted to evaluate conditions affecting a region and to generate alert indicators when appropriate. For example, weather forecast and weather alert information is available from a number of sources and includes identification of areas for which the information is effective, as well as the substance of the information. A weather information service can be monitored and text search mechanisms can be used to recognize postal codes or names of cities identifying regions where activities being monitored are taking place. The substance of the information can be examined. For example, the information can be monitored for the appearance of the words "Alert," "Warning," and "Watch." Upon recognition of the appearance of a word indicating a heightened alert status, alert indicators for activities in areas affected by the condition can be set.

Figure 8:
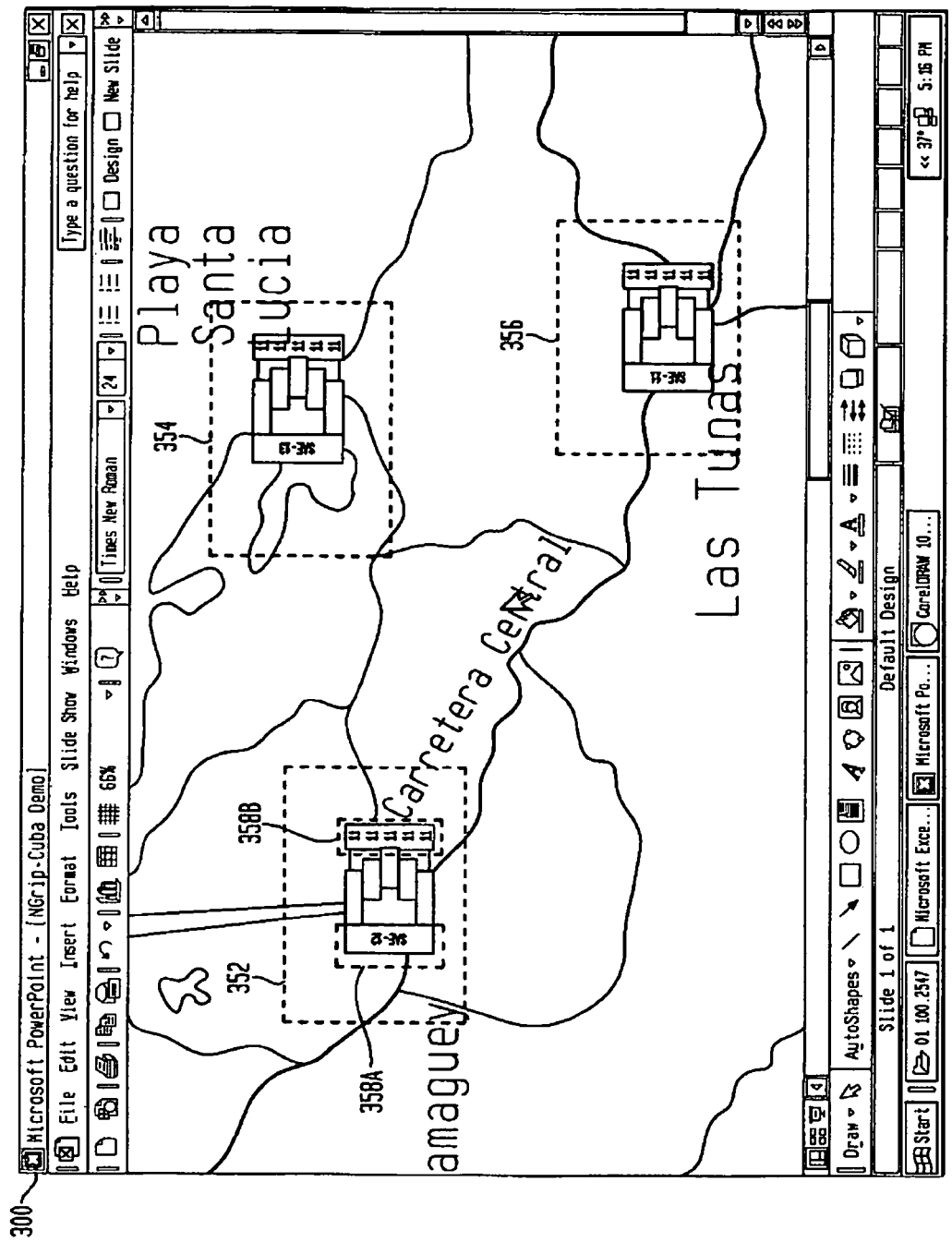

FIG. 8 illustrates the display 300, zoomed in on the area in the vicinity of the icons 352, 354 and 356, which can be seen more clearly, along with their associated alert flags, including the alert flags 358A and 358B. Identification information for each icon can be seen, giving a convenient reference to identify the specific groupings of activities affected by the conditions prompting creation of the alert flags. If the form 200 is active, activating an icon such as the icon 352, for example by double clicking on the icon, will highlight the associated information on the form 200.

FIG. 9 illustrates the steps of a process 900 of project planning and information presentation according to an aspect of the present invention. At step 902, a project information entry and presentation form is created, allowing for entry of project scheduling and progress information for each of a plurality of project activities. At step 904, information relating to the project activities is received and processed. At step 906, a plurality of graphical icons is created, with each icon representing an activity or grouping of activities. The icons include links to scheduling and progress information, so that entry or updating of information relating to designated events relating to the activity or group of activities represented by the icon causes corresponding changes in the appearance of the icon. At step 908, a graphical display is created including geographical information, for example maps, relating to geographic locations in which activities of interest are being carried out or are scheduled to be carried out. At step 910, the icons are placed in the graphical display, with each icon being placed so as to indicate the location where the activities are taking place. For example, if the graphical display includes a map, icons are placed in appropriate locations on the map. The icons are placed in such a way that links to the scheduling and progress information are maintained, so that entry or updating of scheduling and progress information causes changes to the appearance of the icons as they appear on the graphic display. At step 912, in response to updated or changed information, or restrictions or expansions of categories of information to be displayed, the graphic display and the icons presented by the display undergo changes in accordance with the updated information. Updated information may include information relating to start or completion of an activity, updating of schedule status information, entry of an alert indicator, or any of numerous other categories of information. Updating of the graphic display and icons thus provides for a convenient view of changes in their geographic context.

While the present invention is disclosed in the context of several embodiments, it will be recognized that a wide variety of implementations may be employed by persons of ordinary skill in the art consistent with the above discussion and the claims which follow below.

I claim:

1. A system for receiving and presenting project planning and scheduling information, comprising:

a processor;

a computer memory storing a project planning module to control the processor to receive, process and present activity information relating to scheduling of and progress on activities contributing to completion of a project;

the computer memory further storing a graphic display module to control the processor to present graphical icons representing activities contributing to completion of the project, the graphic display module maintaining links to the activity information received and processed by the project planning module so that the graphic icons change in appearance in response to changes in the activity information, the graphic display module being operative to present a geographic image representing one or more geographic regions where the activities are to take place, the icons being placed in the image so as to indicate the geographic location where each activity is to take place, one or more of the icons placed in the image including links to additional detailed information relating to the activities represented by the icons such that activation of a link presents the additional detailed information.

2. The system of claim 1, wherein the icons are constructed using the project planning module, the icons being constructed so as to have links to the activity information, the icons being copied to the graphical display module in such a way that the links between the icons and the activity information are preserved.

3. The system of claim 2, wherein the project planning module accepts filtering commands so as to restrict display of activity information to one or more selected categories, selecting of a filtering command using the project planning module affecting the presentation of icons by the graphical display module so as to restrict the icons displayed to those corresponding to the category or categories selected using the project planning module.

4. The system of claim 3, wherein the project planning module is operative to receive schedule alert status information relating to schedule status of selected activities and wherein the appearance of an icon associated with a selected activity reflects the schedule alert status of the activity.

5. The system of claim 4, wherein the schedule alert status information for one or more activities includes a schedule alert status indicator whose value is assigned based on a comparison of a current date and a scheduled completion date for the activity.

6. The system of claim 4, wherein the schedule alert status indicator associated with one or more activities is assigned based on a delay ratio computed based on a delay of a start of the activity as compared to a scheduled start date, the delay ratio being a ratio of the amount of delay compared to a completion time interval between scheduled start and scheduled completion of the activity.

7. The system of claim 5, wherein one of a number of values may be assigned to the schedule alert status indicator, with different values indicating greater or lesser degrees of delay, with the ratio between the amount of delay versus the completion time being computed and compared against predetermined values and with the schedule alert status indicator being assigned depending which of a range of predetermined values the delay ratio falls into.

8. The system of claim 5, wherein the project planning module is operative to set alert indicators associated with specified activities and wherein the setting of an alert indicator causes the appearance of warning flags in proximity to icons associated with the activities.

9. The system of claim 8, wherein the alert indicators are set based on information relating to conditions affecting one or more geographic regions and wherein alert indicators are set if they are associated with activities in geographic regions affected by the conditions.

10. The system of claim 9, further comprising an information service interface for receiving data from one or more information services, the data being examined to determine if it includes reports of conditions affecting geographic regions in which activities are taking place and wherein the setting of alert indicators depends on a result of the examination of the data.

11. The system of claim 10, wherein the data is examined for text strings indicating a geographic region to which the data relates and wherein the data is examined for predetermined keywords indicating a condition affecting the geographic region.

12. The system of claim 9, wherein the information received from the information services includes adverse weather information.

13. A method of receiving and presenting project planning and scheduling information, comprising the steps of:

receiving activity information relating to activities contributing to completion of a project;

storing the activity information in a computer memory accessible to a processor;

controlling the processor to create one or more links to elements of the activity information;

controlling the processor to create a plurality of icons, one or more of the icons being associated with one or more of the links;

controlling the display to display the icons, and a geographic image relating to a region or regions where the activities are to take place, wherein each icon is placed in the image to indicate a geographic location at which an activity relating to the icon is to take place; and controlling the processor so as to update each icon associated with a link to an activity when a selected change or event occurs relating to the activity; wherein upon activation of a link associated with an icon, detailed information relating to the activity represented by the link is presented.

14. The method of claim 13, further including a step of receiving updated activity information and updating the appearance of icons relating to the activity information in accordance with the updated information.

15. The method of claim 14, wherein the step of receiving the updated activity information includes receiving progress information relating to progress of activities and wherein updating the appearance of icons includes updating the appearance of icons to reflect the progress information.

16. The method of claim 14, further including a step of selecting a category of information for display and restricting display of the icons to those associated with activity information falling into the selected category.

17. The method of claim 16, wherein receiving the updated activity information includes information calling for a setting of an alert indicator for one or more activities and updating of the appearance of the icons includes placing an alert flag in association with each icon associated with an activity for which an alert indicator has been set.

18. The method of claim 17, wherein receiving the updated activity information includes receiving alert condition information reporting conditions affecting a geographic region and wherein an alert indicator is set for an activity when alert condition information indicates adverse conditions for a geographic region in which the activity is planned or taking place.

19. The method of claim 18, wherein receiving the updated activity information includes examining the alert condition information for text strings indicating a geographic region to which the alert condition information relates and examining the alert condition information for predetermined keywords indicating conditions affecting the geographic region.

20. The method of claim 19, wherein the alert condition information includes weather information.

* * * * *